Dec. 5, 1939.  E. BELL  2,181,863
APPARATUS FOR DESTROYING AND REMOVING MARINE
GROWTHS WHICH IMPEDE NAVIGATION
Filed Feb. 28, 1938  4 Sheets-Sheet 1
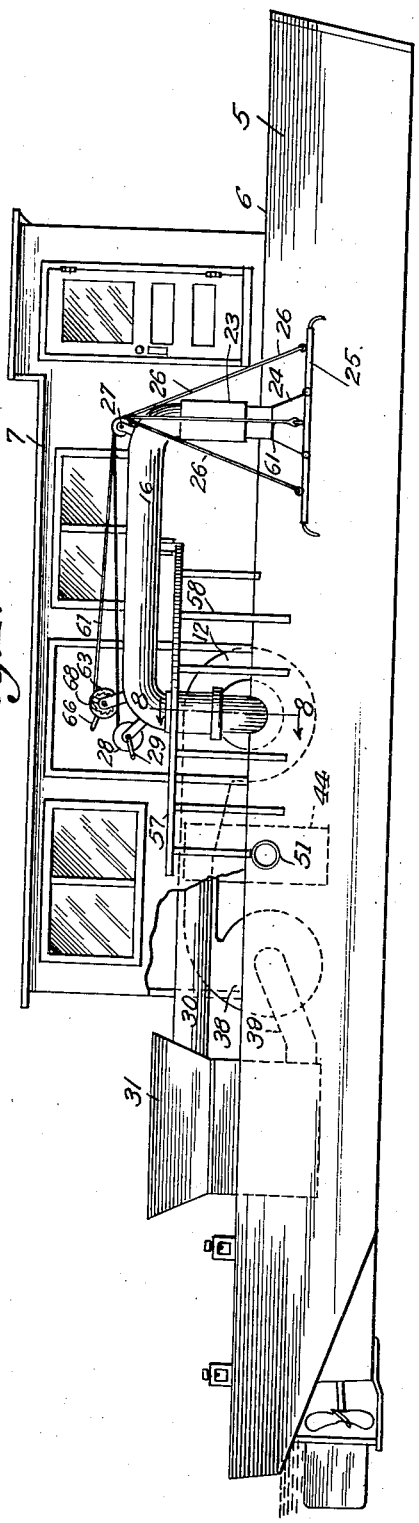
Eddie Bell
INVENTOR
BY Victor J. Evans & Co.
ATTORNEYS

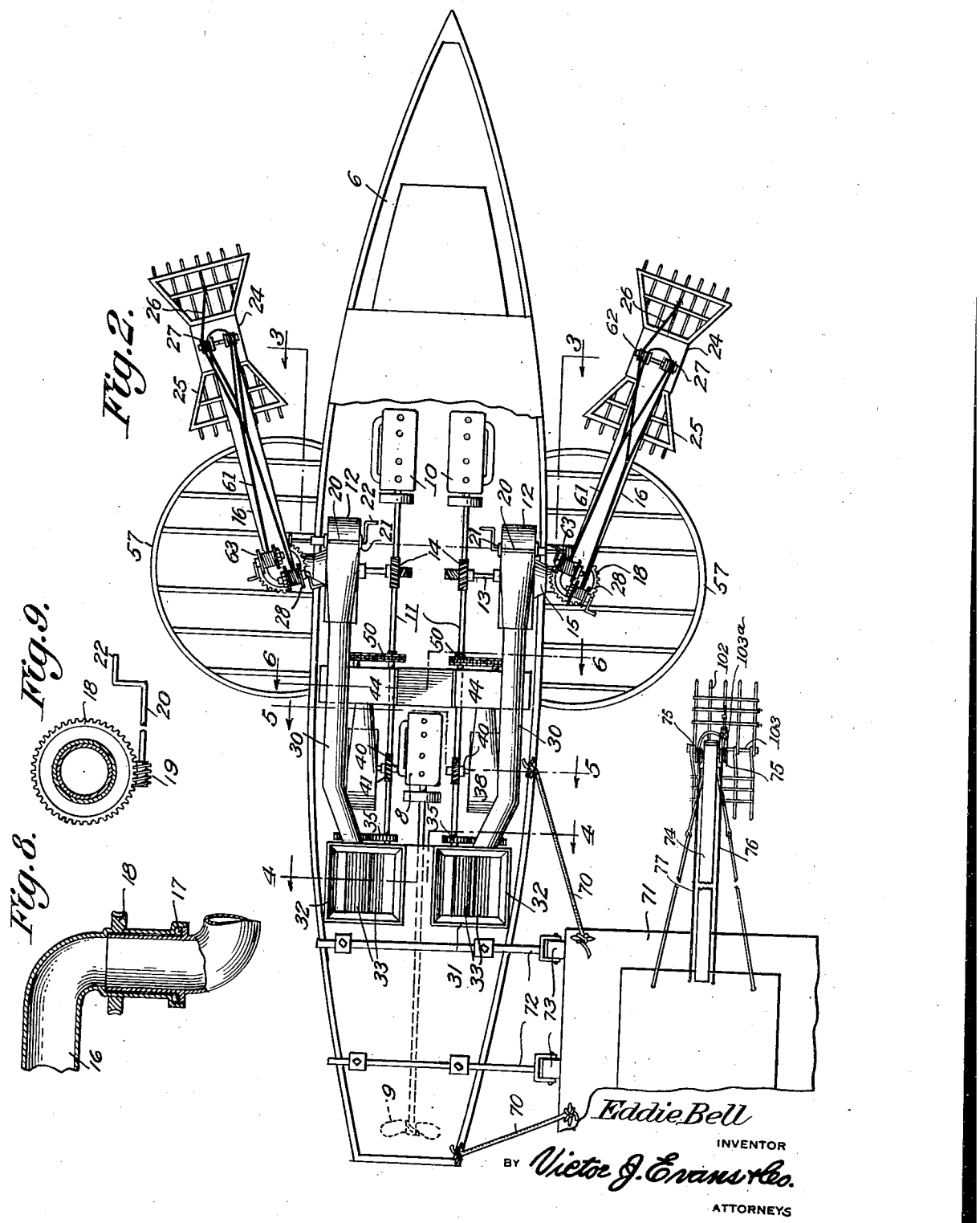

Dec. 5, 1939.                           E. BELL                    2,181,863
              APPARATUS FOR DESTROYING AND REMOVING MARINE
                     GROWTHS WHICH IMPEDE NAVIGATION
                          Filed Feb. 28, 1938         4 Sheets-Sheet 3
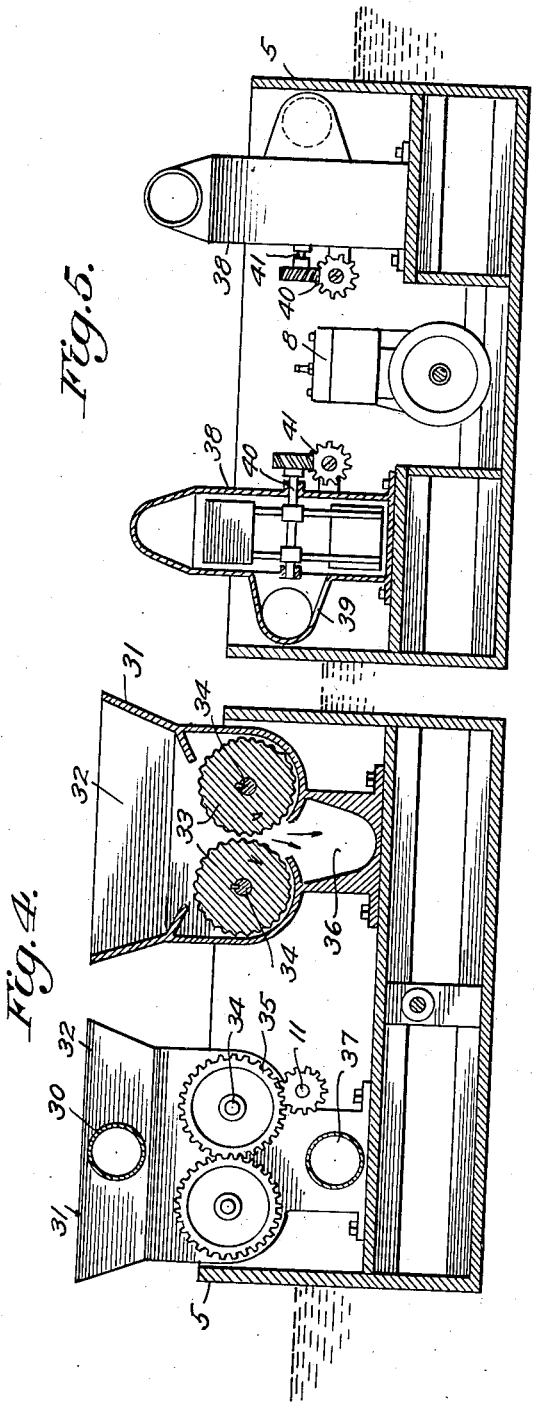
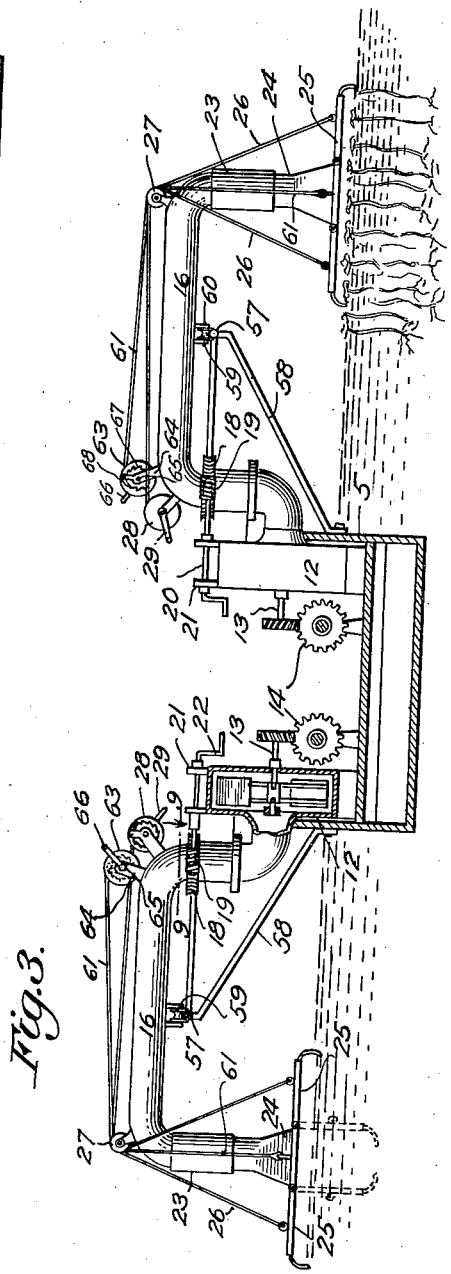
Eddie Bell
INVENTOR
BY Victor J. Evans & Co.
ATTORNEY

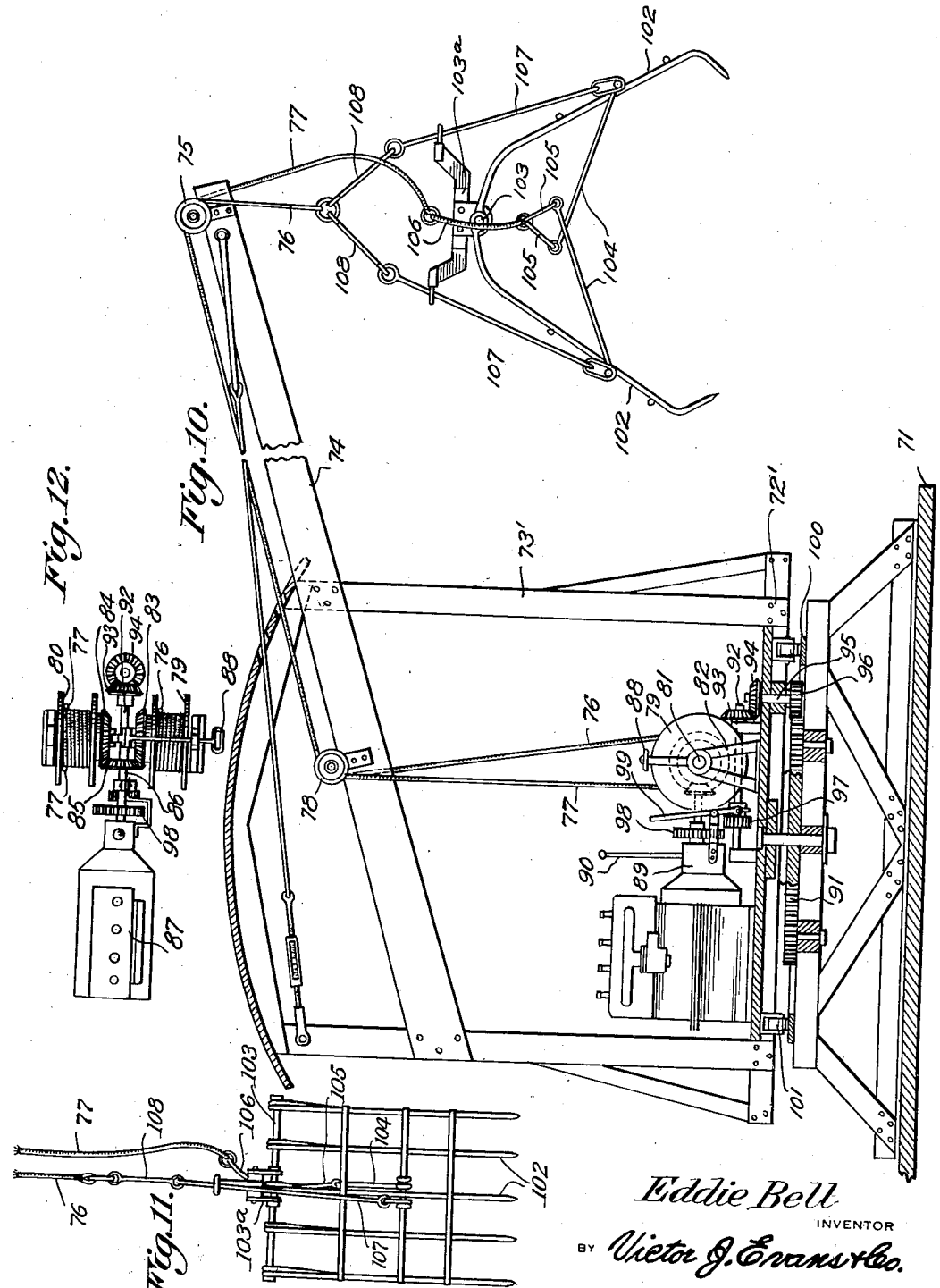

Patented Dec. 5, 1939

2,181,863

UNITED STATES PATENT OFFICE 2,181,863

APPARATUS FOR DESTROYING AND REMOVING MARINE GROWTHS WHICH IMPEDE NAVIGATION

Eddie Bell, Jacksonville, Fla.

Application February 28, 1938, Serial No. 193,157

4 Claims. (Cl. 56—9)

My invention relates to new and useful improvements in devices for destroying and removing marine growths, such as the rapidly growing water hyacinth and similar floating aquatic growths which obstruct the surface of navigable waters and impede, if not prevent, navigation.

It has been the custom to gather and remove the growth from an area to be navigated and redeposit the same at outlying points on the water surface. When thus redeposited the same usually works back to the original area from which it was removed and again impedes navigation. Due to the tremendous weight of the growth and the availability of land where its deposit is not objectionable, the cost of removing the same and depositing it on land is prohibitive.

If the water hyacinth or similar aquatic growth is cut up, finely comminuted or ground and strewn upon the surface of the water, it will decay and sink to the bottom and thereby be destroyed.

One of the principal objects of my invention is to provide an apparatus for removing marine growths impeding navigation, grinding or treating the same and discharging the comminuted or ground mass back into the water where the same will sink and be destroyed.

Another object of my invention is to provide an apparatus of the above described character equipped with suction means for removing the growth from the water and conveying the same to a grinding means and subsequent discharge back into the water.

A further object of my invention is to provide an apparatus of the above described character adapted for mounting upon the deck of a water craft from which the same may be operated over various predetermined areas of water.

A still further object of my invention is to provide an apparatus of the above described character having auxiliary means for effectively loosening certain of the marine growths from the bottom of the water whereby the same may be removed by the suction means.

Other objects and advantages will be apparent from the following description, appended claims and annexed drawings.

Referring to the drawings wherein like reference characters designate like parts throughout the several views:

Fig. 1 is a side elevation of a water craft illustrating my invention mounted thereon.

Fig. 2 is a top plan view thereof.

Figures 3, 4, 5 and 6 are sectional views taken on the lines 3—3, 4—4, 5—5 and 6—6 of Figure 1, respectively.

Fig. 7 is a detail sectional view taken on the line 7—7 of Figure 6.

Fig. 8 is a detail sectional view taken on the line 8—8 of Figure 1.

Fig. 9 is a detail sectional view taken on the line 9—9 of Figure 3.

Fig. 10 is a vertical sectional view illustrating the auxiliary means for loosening or removing the growths from the bottom of the water.

Fig. 11 is a detail front elevation of the grapple employed in the apparatus illustrated in Figure 10.

Fig. 12 is a fragmentary top plan view illustrating the drive mechanism for operating the grapple.

In practicing my invention I provide a water craft 5 of typical construction having a deck 6 on which is a deck house 7 and in which is located a motor 8 for operating said craft by means of the usual propeller drive 9.

Mounted on the deck and within said deck house are a pair of motors 10 equipped with drive shafts 11 for operating a pair of marine growth removing and grinding devices, one of said devices being operable about each side of said craft.

Inasmuch as both of said devices are of substantially identical construction, a detailed description of one device will suffice, it being understood, for the purpose of description, that the reference numerals indicative of parts of one device are indicative of like parts of the other.

Mounted on the deck and within said deck house is a rotary pump 12 having a driven shaft 13 connected to said drive shaft 11 by means of gearing 14 whereby the motor 10 serves to drive said pump. The inlet connection 15 of said pump extends laterally without said deck house and is inflected upwardly to receive thereover a downwardly inflected end of a suction conduit 16. A suitable ball bearing assembly 17 effects a bearing connection between the parts. The downwardly extending end of the conduit 16 has mounted thereon a gear 18 meshing with a gear 19 fixed to a shaft 20 journaled in bearings 21 secured to the upper outer wall of the pump 12. The shaft 20 is fashioned with a crank handle 22 for manual operation whereby the conduit 16 may be rotated relative to the pump 12 and water craft 5. The outer end of the conduit 16 is likewise inflected downwardly and receives thereover a telescopic sleeve 23 fashioned with a subjacently extending suction or feed nozzle 24. Pivoted to the lower outer and inner edges of the nozzle 24 are a pair of rakes 25 adapted to be raised and lowered by means of connected cables 26 trained over pulleys 27 mounted on the conduit 16 and drum 28 likewise mounted on said conduit. The drum 28 is actuated by means of a crank handle 29 and the lowering of the rakes 25 serves to rake the water growth within the area covered by the nozzle 24.

The pump 12 is provided with a discharge connection 30 effecting communication with a grinding device 31. Said grinding device comprises a hopper 32 having disposed therein a pair of coacting grinding rollers 33 rotated in opposite directions relative to each other by means of shafts 34 keyed thereto and connected by trained gearing 35 to the drive shaft 11. Said device is formed with a discharge chamber 36 subjacent said rollers 33 and fashioned with a discharge port 37 connected to the inlet side of a second pump 38 by means of a connection 39. The pump 38 is provided with a driven shaft 40 connected to the drive shaft 11 by means of gearing 41 whereby the pump 38 is operated. The pump 38 is formed with a discharge connection 42 communicating with an upper chamber 43 of a rotary press 44, the latter being for the purpose of more finely grinding and compressing the marine growth thus insuring quick disposal and decay when the growth is discharged into the water. Below the inlet chamber 43 the press 44 is fashioned with an adjustable cylindrical shaped side wall 45 for coaction with the grinding wheel 46 rotatably mounted on a shaft 47 journaled in the housing of the device and extends therefrom at one side and equipped with a driven sprocket 48 connected to a driving sprocket 49 carried by the drive shaft 11 by means of a sprocket chain 50. Subjacent said shaft 47 the housing of the device 44 is formed with a discharge conduit 51 extending through the side of said craft.

The outer face of the grinding wheel 46, opposite the wall 45, is fluted whereby particles of marine growth discharged therebetween are subjected to a grinding and compressing operation for discharge through the conduit 51. The upper wall 52 of the chamber 43 is hinged at one side as at 53 and maintained in closed position at the opposite side by means of a spring 54 mounted on a rod 55 pivotally connected to the housing as at 56. The spring 54 normally maintains the wall 52 in closed position. However, should marine growth and the like become jammed within the housing, said growth will act against the wall 52 and compress the spring whereby to actuate the wall 52 to an open position.

The conduit 16 and connected parts are supported by means of an arcuate shaped bracket 57 extending laterally of the deck house and connected to the side of the craft by means of downwardly and inwardly extending braces 58. The arcuate shaped bracket 57 constitutes a track for engagement with a roller 59 rotatably secured on the underface of the conduit 16 by means of a bearing 60 whereby to support and permit free rotation of the conduit.

Secured to the lower edge of the nozzle 25 are ends of a pair of cables 61, the opposite ends being trained over pulleys 62 and connected to a drum 63 mounted on the conduit 16 by means of brackets 64 having a shaft 65 which is keyed to said drum journaled therein. The shaft 65 is provided with a crank handle 66 and a ratchet wheel 67 engageable by a pawl 68 whereby the drum is manually rotated to maintain the nozzle in raised position. Release of the pawl 68 serves to permit lowering of the nozzle whereby the same is adjusted relative to the surface of the water.

Secured to the side of the craft by means of cables 70 is a barge 71. A pair of spacing members 72 secured to the deck of the craft serve to space the barge from said craft. The spacing members are provided on the outer ends thereof with rollers 73 for engagement with the side of the barge.

Mounted on a base frame on the deck of the barge is a grapple device comprising a rotatable deck 72' having a deck house 73' secured thereon. Secured to said deck house and extending therefrom above the surface of the water is an arm 74, the outer end of which is provided with a pair of pulleys 75 over which are trained cables 76 and 77. The inner ends of said cables are trained over a pair of pulleys 78 and extend downwardly for connection with a pair of drums 79 and 80. The cable 76 is connected to the drum 79 and the cable 77 is connected to the drum 80. Said drums are fixed on a shaft 81 journaled in brackets 82 secured to the deck 72'. A pair of gears 83 and 84 are rotatably mounted on the shaft 81 and mesh with a gear 85 mounted on the drive shaft 86 of a motor 87. A clutch element 88 serves to effect connection between the gear 83 and drum 79 and between the gear 84 and drum 80, said clutch element being slidably keyed to the shaft 81 and operated into and out of clutched position with the respective gears by means of a handle 88 connected thereto and carried by one of the brackets 82. This construction permits the cables to be selectively operated for a purpose hereinafter described. The motor is provided with the usual reversing mechanism enclosed within a housing 89 and operated by means of a reverse lever 90.

Mounted on the upper face of the base frame, subjacent the rotatable deck 72, is a spur gear 91 secured thereto by means of bolts. A shaft extends through said gear and is connected to the deck 72' whereby said deck may pivot about said frame. The outer end of an auxiliary shaft 92, mounted subjacent the drive shaft 86, is provided with a bevel gear 93 in mesh with a similar gear 94 secured to the upper end of a vertical shaft 95 carried by the deck 72. The lower end of the shaft 95 has fixed thereto a gear 96 in mesh with the spur gear 91 whereby said deck is rotated upon actuation of the shaft 92. Slidably mounted on the shaft 92 is a gear 97 adapted to be shifted into and out of engagement with a gear 98 fixed on the drive shaft 86. A suitable handle 99 is connected to the gear 97 and pivoted to the deck for manually shifting the gear 97.

The upper face of the base frame has secured thereon a circumferentially extending track 100 over which travel rollers 101 carried by the underside of the deck 72 and which support the deck on the base frame.

Secured to the outer ends of the cables 76 and 77 are tongs having tine sections 102 pivotally connected together as at 103 to a supporting member 103a. Each of the tine sections has pivoted thereto inwardly extending links 104 terminating in crossed end sections pivotally connected to the lower ends of a pair of pivoted links 105. The upper ends of said links 105 are connected to the lower end of the cable 77 by a section of cable 106. The outer ends of the supporting member 103a are eyed and receive therethrough downwardly extending rods 107 having the lower ends pivotally connected to the outer ends of the links 104 and the tine sections 102. The upper ends of the rods 107 are connected to the outer end of the cable 76 by means of cable sections 108. From the foregoing it will be apparent that operation of the drum 79 through the medium of the motor 87 and connected parts serves to lower the tongs in open position for engagement with water growth on the water bed. Actuation of the drum 80 through the medium of the cable 77 serves to close the tongs about the water growth and raise the same, thereby disengaging said growth from the water bed.

In operation, the water craft is moved over the surface of the water adjacent an area from which it is desired to remove the water growth and the suction conduit actuated over said area to position the suction nozzle above the water growth. In this position the pumps and grinding devices are operated and the water growth below the nozzle is drawn through the suction conduit to the grinding devices and discharged back into the water as heretofore described. In instances where the water growth is deeply rooted, the grapple device is brought into operation and the tongs thereof lowered to loosen the growth from the water bed as heretofore described.

From the foregoing it will be apparent that my invention provides a simple and efficient means of removing water growth from navigable waters and of grinding the same and redepositing the mass into the water where it will sink and be destroyed.

What I claim is:

1. An apparatus of the class described, comprising, in combination, a water craft, a suction pump mounted on said craft, a grinding device connected to the discharge end of said pump, a second pump connected to said grinding device, a grinding and compressing device connected to said second pump and having a discharge conduit extending without said craft, a suction conduit having a nozzle extending over said craft and connected to said first mentioned pump, and means for adjusting said nozzle relative to the surface of the water adjacent said craft whereby water growth is removed from the water through said conduit to said devices for discharge into said water.

2. An apparatus of the class described, comprising, in combination, a water craft, a suction pump mounted on said craft, a grinding device connected to the discharge end of said pump, a second pump connected to said grinding device, a grinding and compressing device connected to said second pump and having a discharge conduit extending without said craft, a suction conduit having a nozzle extending over said craft and connected to said first mentioned pump, means for adjusting said nozzle relative to the surface of the water adjacent said craft whereby water growth is removed from the water through said conduit to said devices for discharge into said water, and means for adjusting said conduit relative to said craft for removing desired areas of water growth from the water.

3. An apparatus of the class described, comprising, in combination, a water craft, a suction pump mounted on said craft, a grinding device connected to the discharge end of said pump, a second pump connected to said grinding device, a grinding and compressing device connected to said second pump and having a discharge conduit extending without said craft, a suction conduit having a nozzle extending over said craft and connected to said first mentioned pump, means for adjusting said nozzle relative to the surface of the water adjacent said craft whereby water growth is removed from the water through said conduit to said devices for discharge into said water, means for adjusting said conduit relative to said craft for removing desired areas of water growth from the water, a barge connected to said craft, and a grapple device mounted on said barge and adapted to loosen water growth for removal through said nozzle.

4. An apparatus of the class described, comprising, in combination, a water craft, a suction pump mounted on said craft, a grinding device connected to the discharge end of said pump, a second pump connected to said grinding device, a grinding and compressing device connected to said second pump and having a discharge conduit extending without said craft, a suction conduit having a nozzle extending over said craft and connected to said first mentioned pump, means for adjusting said nozzle relative to the surface of the water adjacent said craft whereby water growth is removed from the water through said conduit to said devices for discharge into said water, a barge connected to said craft, and a grapple device mounted on said barge and adapted to loosen water growth for removal through said nozzle.

EDDIE BELL.